US012479009B2

(12) United States Patent
Harper

(10) Patent No.: US 12,479,009 B2
(45) Date of Patent: Nov. 25, 2025

(54) SINGLE SORTED PARCEL DISTRIBUTION SYSTEM AND METHOD

(71) Applicant: Kenneth Harper, Missoula, MT (US)

(72) Inventor: Kenneth Harper, Missoula, MT (US)

( * ) Notice: Subject to any disclaimer, the term of this patent is extended or adjusted under 35 U.S.C. 154(b) by 0 days.

(21) Appl. No.: 18/755,931

(22) Filed: Jun. 27, 2024

(65) Prior Publication Data

US 2025/0205743 A1 Jun. 26, 2025

Related U.S. Application Data

(63) Continuation-in-part of application No. 18/392,015, filed on Dec. 21, 2023, now abandoned.

(51) Int. Cl.
*B07C 3/18* (2006.01)
*B07C 3/00* (2006.01)
*B07C 3/08* (2006.01)

(52) U.S. Cl.
CPC ................ *B07C 3/18* (2013.01); *B07C 3/008* (2013.01); *B07C 3/087* (2013.01)

(58) Field of Classification Search
CPC ............ B07C 3/18; B07C 3/008; B07C 3/087
See application file for complete search history.

(56) References Cited

U.S. PATENT DOCUMENTS

2018/0362287 A1* 12/2018 Weissbrod ............. B65H 49/38
2023/0381821 A1* 11/2023 Piontek ................... B07C 3/008

OTHER PUBLICATIONS

USPS, "Systems at Work", Jun. 5, 2014, https://www.youtube.com/watch?v=WX16-52bHvg (Year: 2014).*

* cited by examiner

*Primary Examiner* — Jacob S. Scott
*Assistant Examiner* — Miraj T. Patel
(74) *Attorney, Agent, or Firm* — Dale J. Ream

(57) ABSTRACT

A method for distribution of parcels which avoids repeated sorting steps at downstream distribution hubs by segregating the parcels at a first distribution hub according to a final destination such that the segregated parcels are distributed at downstream distribution hubs without re-sorting the segregated parcels. More particularly, the distribution method includes the step of providing a plurality of storage and delivery bins each having a base assembly and a pair of side walls extending upwardly from the base assembly and having a top wall extending between the upper ends of the pair of side walls. A plurality of bin sorting procedures is carried out until a trailer includes only delivery bins having a same delivery destination and can be unloaded using an elongate conveyor belt assembly extending through interior areas of a plurality of consolidated delivery bins while still positioned on a trailer.

15 Claims, 17 Drawing Sheets

Fig. 16
IOWA
NEBRASKA
Omaha
United States
Topeka
Kansas City
KANSAS
MISSOURI
CHEROKEE
NATION
OKLAHOMA
Oklahoma City

SINGLE SORTED PARCEL DISTRIBUTION SYSTEM AND METHOD

REFERENCE TO RELATED APPLICATIONS

This application claims the non-provisional patent application U.S. Ser. No. 18/392,015 filed Dec. 21, 2023 titled Single Sorted Parcel Distribution System and Method, which is incorporated in its entirety in the present application.

BACKGROUND OF THE INVENTION

This invention relates generally to a parcel distribution system and method in which a given parcel is sorted only a single time and then segregated into a designated storage bin with parcels having a common final delivery destination. Further, each storage bin has a base assembly complementary to forklift arms such that the entire storage bin may be transferred between delivery vehicles without being unloaded and resorted.

Parcels that are shipped by couriers such as Amazon, UPS, FedEx, and the like are often sorted and routed using a complex series of conveyors. This reality takes a significant amount of time and results in multiple groupings of parcels to be delivered to a large number of destinations. The plurality of parcels may be loaded into a van or semitruck trailer and transported to another location hopefully in the direction of a final destination of some or all of the parcels. Typically, all of the parcels on an incoming delivery vehicle are unloaded and, often, combined with additional parcels submitted at the intermediate destination and sorted again before being segregated and transported downstream. Repeated sorting events is inefficient, time-consuming, and wasteful of resources.

Therefore, it would be desirable to have a parcel distribution system and method in which a respective parcel undergoes only a single sorting event in which parcels having a common final delivery destination are situated in a common storage bin, designated according to said common final delivery destination, and loaded on a delivery vehicle. At downstream distribution hubs, the designated storage bin is merely moved, such as via forklift, to other appropriate delivery vehicles without being sorted again. Further, it would be desirable to have a parcel delivery system and method having a plurality of storage bins that each may be designated as containing parcels segregated to a common final delivery destination and having a configuration conducive for efficient and immediately adjacent positioning in a delivery trailer.

And, according to a critical aspect, it would be desirable to have a parcel distribution system in which a plurality of storage bins having a common final destination are positioned front-to-back upon a trailer such that a conveyor belt assembly may be positioned to extend simultaneously through said plurality of storage bins for fast and efficient offloading of packages. In other words, packages from a plurality of storage bins may be removed while the storage bins are still on a trailer.

SUMMARY OF THE INVENTION

A method for distribution of parcels which avoids repeated sorting steps at downstream distribution hubs by segregating the parcels at a first distribution hub according to a final destination such that the segregated parcels are distributed at downstream distribution hubs without re-sorting the segregated parcels. The distribution method includes the step of providing a plurality of storage and delivery bins each having a base assembly and a pair of side walls extending upwardly from the base assembly and having a top wall extending between the upper ends of the pair of side walls. Each delivery bin may include (1) a first door that is selectively movable between an open configuration allowing access to an interior area and a closed configuration blocking access to the interior area and (2) a second door that is selectively movable between an open configuration allowing access to the interior area and a closed configuration blocking access to the interior area. It will be understood that each door can be opened outwardly (i.e., to the exterior of the container) or, opened inwardly (i.e., into the interior of the container) and either act of opening the door allows access to and through the interior area. The distribution method may include the steps of (1) sorting a plurality of packages according to a final delivery destination associated with a respective package, thereby segregating the sorted packages, (2) storing the segregated packages having a common final delivery destination in respective delivery bins, and (3) designating with indicia that the respective delivery bin is for delivery to the final delivery destination.

In a critical aspect, a plurality of storage bins associated with a common destination are positioned atop a common trailer in a front-to-back configuration such that front and rear access doors of the plurality of storage bins may be opened and a conveyor belt assembly may be extended through the opened storage bins for offloading packages stored therein, respectively.

Therefore, a general object of this invention is to provide a distribution system and method for delivery of parcels to predetermined delivery destinations in a manner that is efficient and without multiple sorting events.

Another object of this invention is to provide a distribution system and method, as aforesaid, that includes a plurality of storage bins each corresponding to parcels having a common final delivery destination.

Still another object of this invention is to provide a distribution system and method as aforesaid, in which a plurality of storage bins may be positioned tightly in a delivery vehicle such as a semi-truck trailer.

Yet another object of this invention is to provide a distribution system and method as aforesaid, in which a plurality of storage bins destined for a common final delivery location may be positioned atop a singular trailer in a front-to-back configuration and opened so that a conveyor belt assembly is simultaneously extendable through said plurality of storage bins for fast and efficient offloading to a local delivery vehicle.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

A package distribution method that includes only a single package sorting action according to a preferred embodiment of the present invention will now be described with reference to the accompanying drawings. The distribution method 10 includes a plurality of package storage bins 20 each having a pallet-style base assembly 22 such that segregated groupings of parcels may be stored in respective bins 20 which may then be packed tightly in respective delivery vehicles and moved as needed using a forklift until delivered at a final delivery destination. Preferably, the plurality of bins 20 may be positioned and packed tightly inside.

Figure 15:
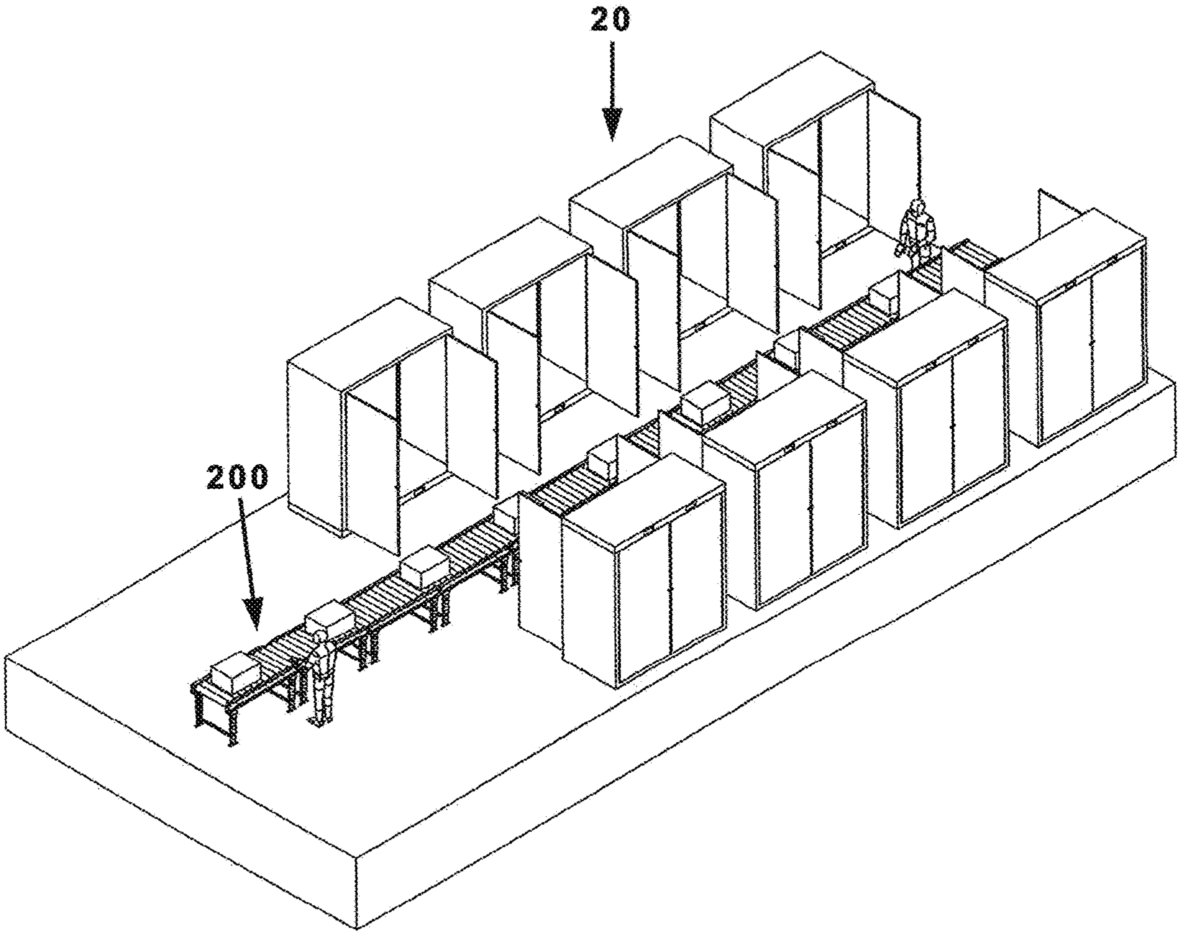
FIG. 15 is a perspective view illustrating a plurality of container bins being loaded and segregated according to the present invention.

Critical to the present invention, a plurality of bins 20 are provided for storing a plurality of parcels, which are initially sorted, such as using conveyors (FIG. 15), according to a final delivery destination address such that the parcels are segregated into distinct groups or piles—each segregated group containing parcels having a common delivery address or, at least, a general delivery area, also called a delivery "service area." An example of segregating packages bound for distinct cities will be discussed later.

Figure 1A:
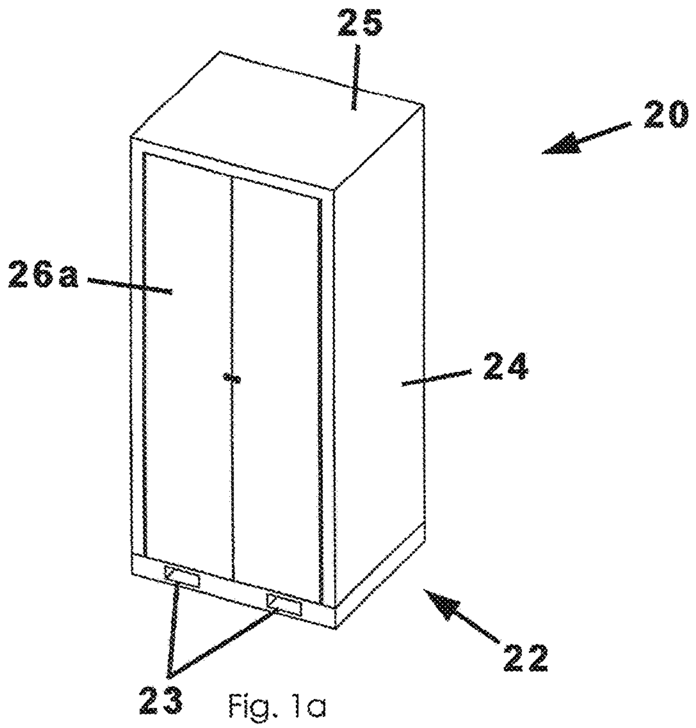
FIG. 1*a* is a perspective view of a storage bin according to a preferred embodiment of the present invention.
Figure 1B:
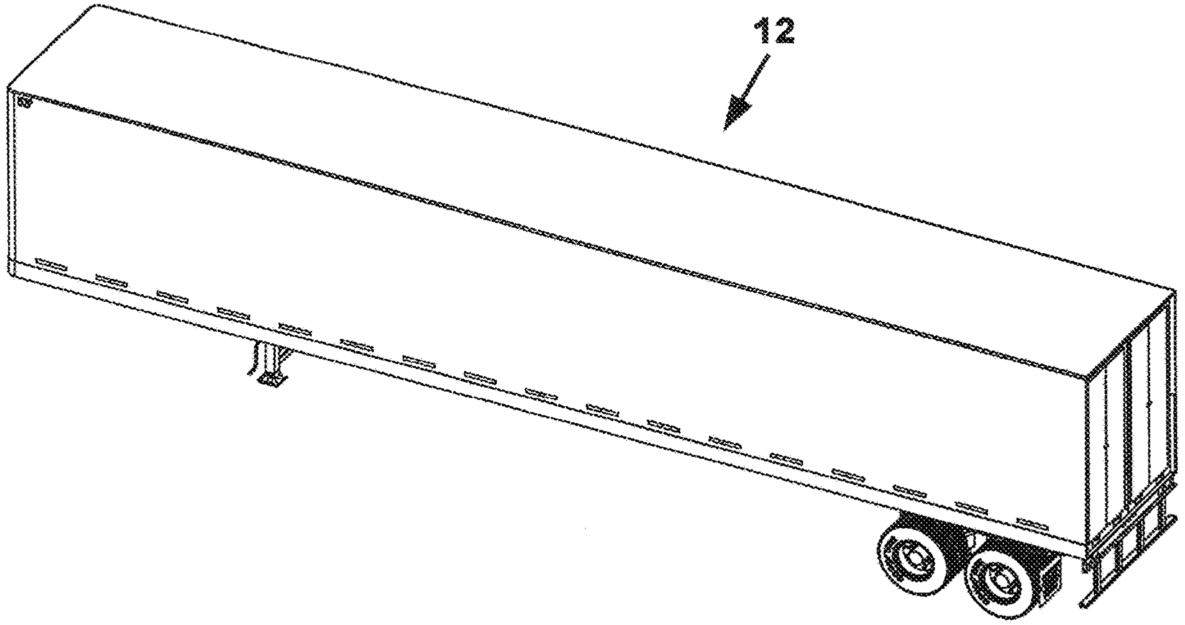
FIG. 1*b* is a perspective view of a delivery vehicle and, namely, a semi-truck trailer, according to the present invention.
Figure 2A:
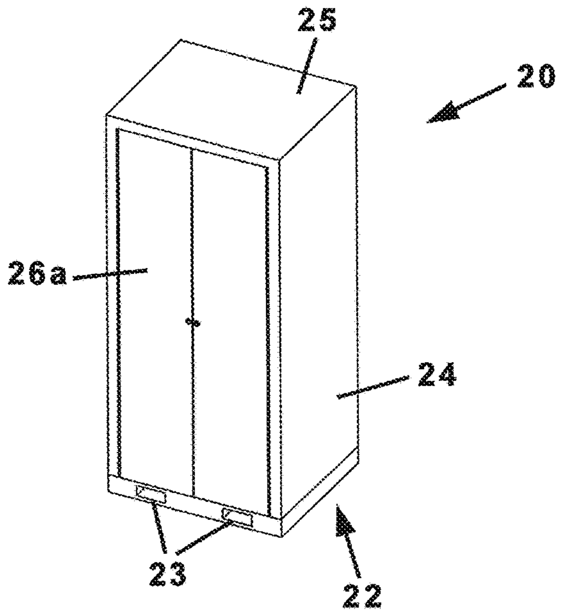
FIG. 2*a* is another perspective view of the storage bin as in FIG. 1*a*.
Figure 2B:
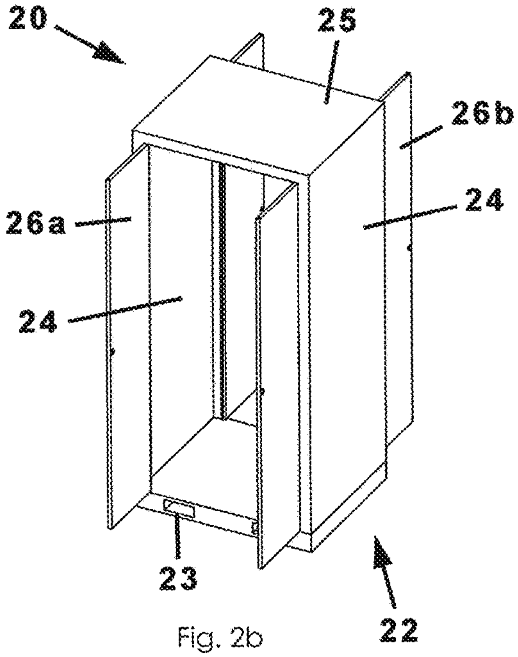
FIG. 2*b* is a perspective view of the storage bin as in FIG. 2*a*, illustrated with both first and second doors in an outwardly open configuration.
Figure 2C:
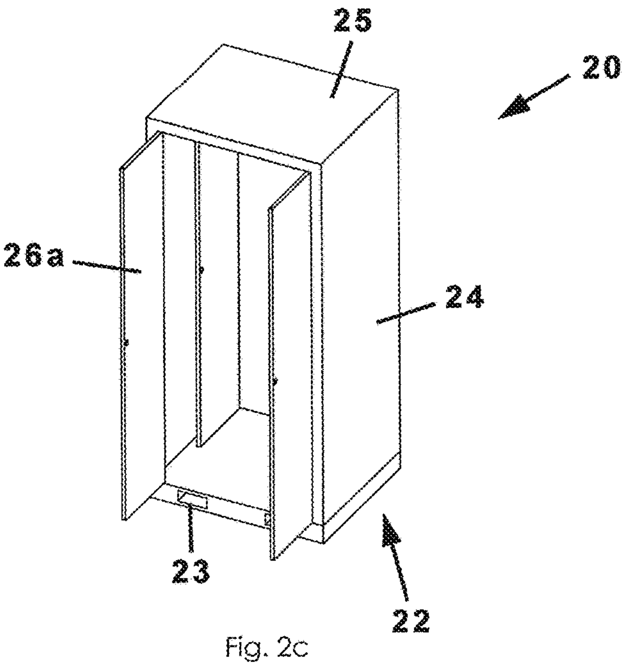
FIG. 2*c* is a perspective view of the storage bin as in FIG. 2*a*, illustrated to show the first door in an outwardly open configuration and the second door in an inwardly open configuration.
Figure 3A:
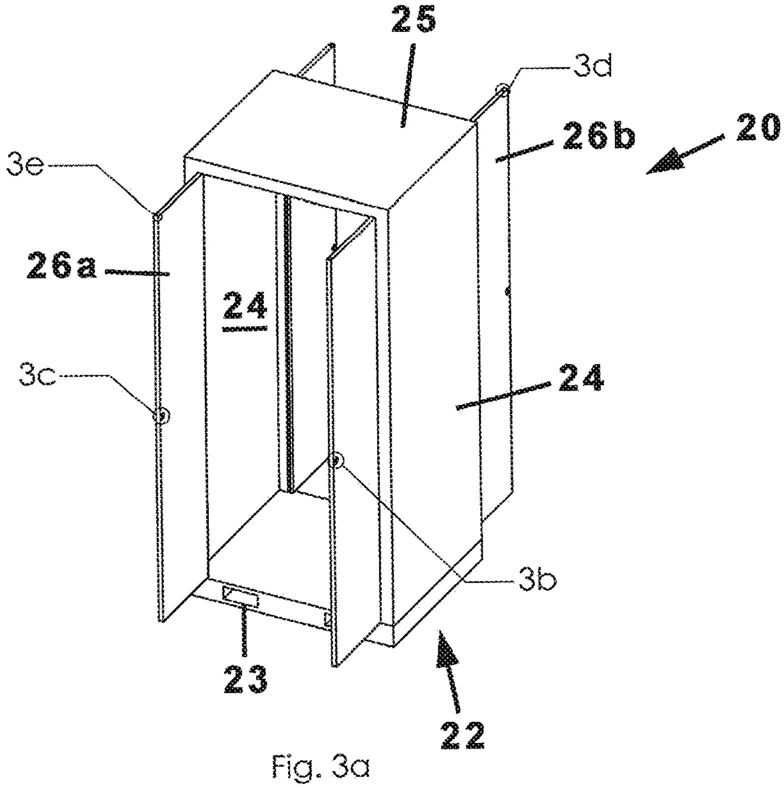
FIG. 3*a* is a perspective view of the storage bin as in FIG. 2*b;*
Figure 3B:
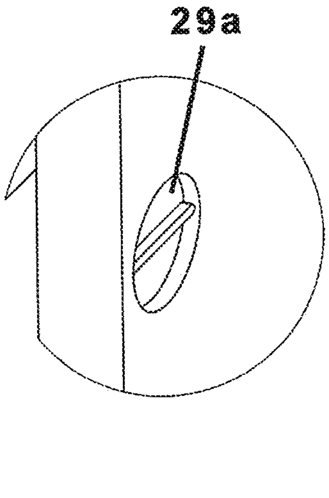
FIG. 3*b* is an isolated view on an enlarged basis taken from FIG. 3*a;*
Figure 3C:
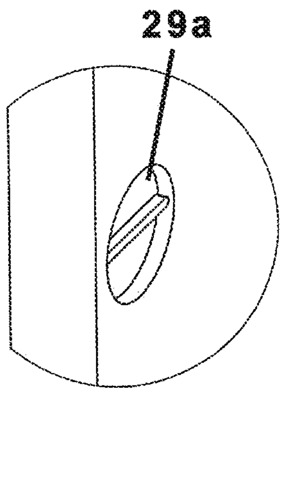
FIG. 3*c* is an isolated view on an enlarged basis taken from FIG. 3*a;*
Figure 3D:
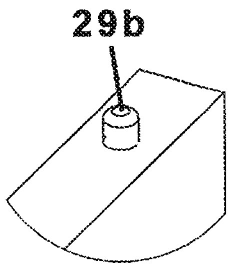
FIG. 3*d* is an isolated view on an enlarged basis taken from FIG. 3*a;*
Figure 3E:
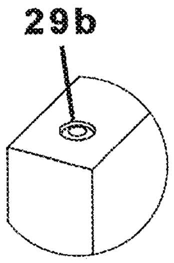
FIG. 3*e* is an isolated view on an enlarged basis taken from FIG. 3*d;*

A parcel storage bin 20 will be described with reference to FIGS. 2*a* to 2*c*. Each bin 20 may include a base assembly 22, the base assembly 22 providing the base or bottom component upon which other aspects of the bin 20 are supported. More particularly, the base assembly 22 may define at least one and, preferably, a pair of lift channels 23, configured to receive arms of a forklift or pallet jack. In other words, a storage bin 20, as will be described in greater detail, may be lifted and transported using a forklift. It will be understood that a storage bin 20 may also be referred to as a storage container, container bin, or delivery bin 20.

Further, each storage bin 20 includes a pair of side walls 24, each side wall 24 extending upwardly from lateral peripheral edges of the base assembly 22. In an embodiment, the pair of side walls 24 are parallel to one another and are vertically oriented to extend upwardly at right angles to a planar upper surface of a respective base assembly 22. The pair of side walls define a void therebetween. Preferably, each storage bin 20 includes a top wall 25 extending between upper edges of the pair of side walls 24 such that the sidewalls 24 and top wall 25, together, define a storage area. Each storage bin 20, therefore, defines a length, a width, and a depth that is capable of storing parcels or packages.

Figure 4A:
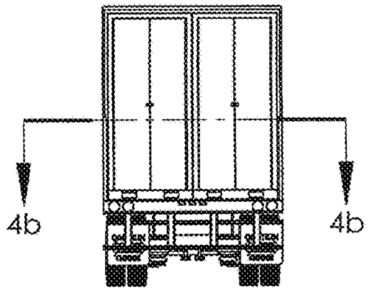
FIG. 4*a* is a rear view of the trailer as in FIG. 1*b;*
Figure 4B:
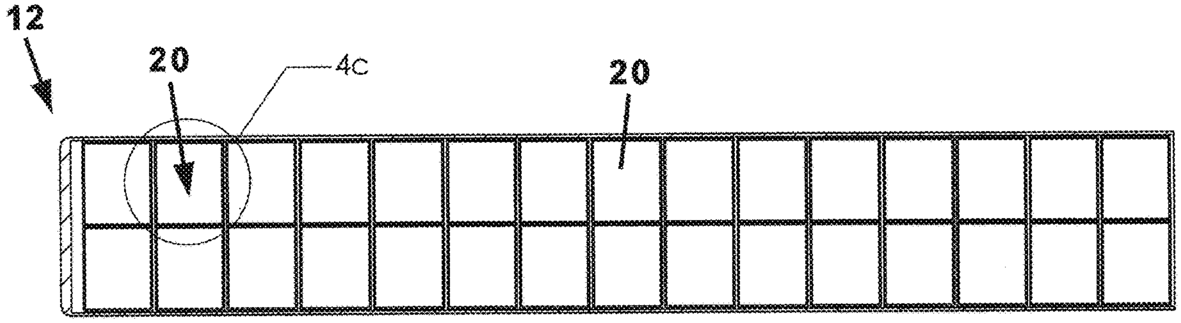
FIG. 4*b* is a sectional view taken along line 4*b*-4*b* of FIG. 4*a;*
Figure 4C:
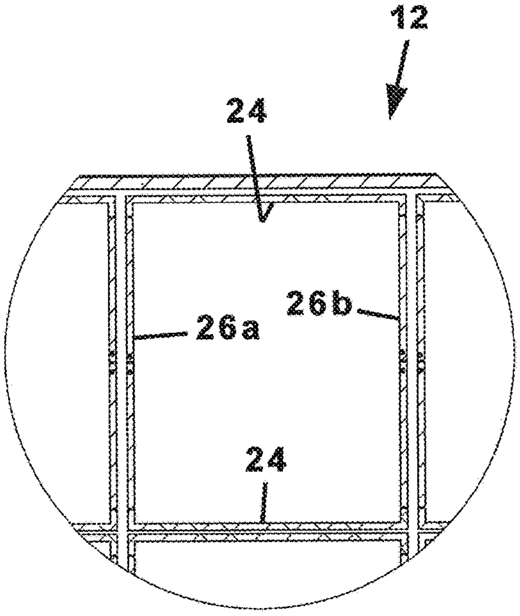
FIG. 4*c* is an isolated view on an enlarged basis taken from FIG. 4*b;*
Figure 5A:
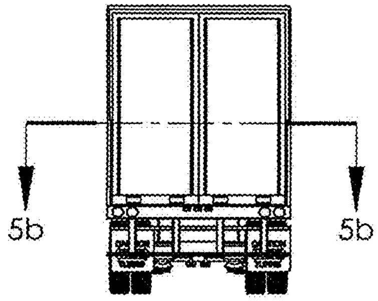
FIG. 5*a* is a rear view of the trailer as in FIG. 1*b;*
Figure 5B:
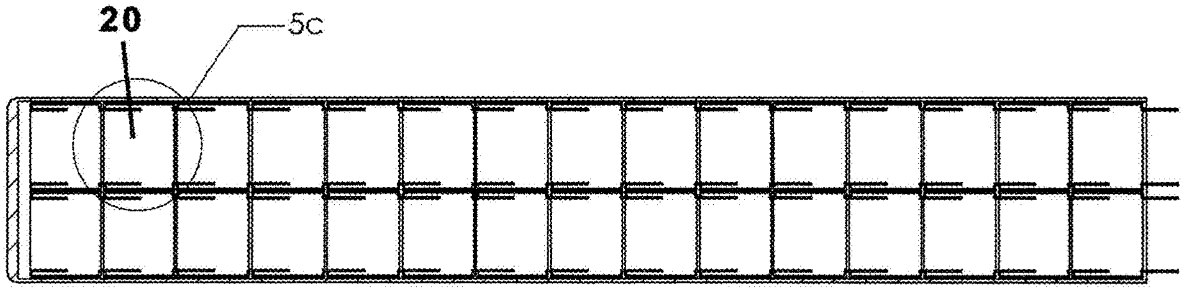
FIG. 5*b* is a sectional view taken along line 5*b*-5*b* of FIG. 5*a;*
Figure 5C:
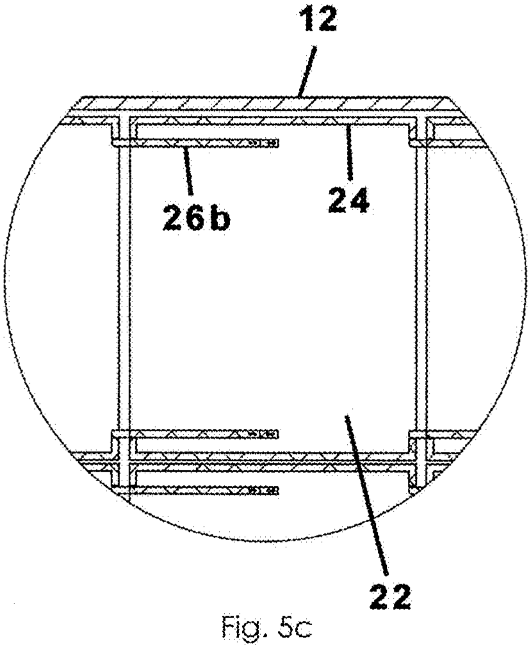
FIG. 5*c* is an isolated view on an enlarged basis taken from FIG. 5*b;*

In a preferred embodiment, each embodiment includes a front and a rear that, except as will be described below, is open such that the interior area defined by the walls is accessible. However, each storage bin 20 may include a first door 26*a* (which, in some embodiments, may include a pair of first doors 26*a*) that may be pivotally coupled to the front of the pair of side walls 24, respectively, and pivotally movable between an open configuration that allows access to the interior area from a front direction and a closed configuration blocking access into the interior area. Similarly, each storage bin 20 may include a second door 26*b* (which, in some embodiments, may include a pair of second doors 26*b*) that may be pivotally coupled to a rear of the pair of side walls 24, respectively, and pivotally movable between an open configuration that allows access to the interior area from a rear direction and a closed configuration blocking access into the interior area. It is understood, therefore, that parcels may be inserted or loaded into respective storage bins 20 when either the first or second door 26*a*, 26*b* is in its open configuration or when both are open at the same time as will be described later. It is understood that the doors may be pivoted both inwardly and outwardly (FIGS. 4*b* and 5*b*). Each door may include a specific type of knob 29*a* having a generally planar configuration and a mechanism for locking or unlocking the doors as shown in FIGS. 3*a* to 3*e*. Specifically, each door may have a locking pin 29*b* operable between deployed or retracted configurations.

Now described in greater detail, each storage bin 20 includes a substantial height dimension (i.e., the elongate length of the pair of side walls 24), a width dimension (i.e., a distance between the pair of side walls 24), and a depth dimension (i.e., the distance between the front and rear open spaces defined by the pair of side walls 24). Preferably, the depth dimension is smaller than both the height and width dimensions so that a large plurality of storage bins 20—each including only parcels to a specific final delivery destination—may be situated in a delivery vehicle such as a semi-truck trailer 12—and such that each is easily movable with a forklift. More particularly, each storage bin 20 defines a size and uniform shape configuration that enables the plurality of storage bins 20 to be moved, positioned, or packed tightly into an interior area of a semi-truck trailer 12 with virtually no wasted space between respective storage bins 20 (FIG. 4*b*). Importantly, the plurality of storage bins 20 may be situated in the interior area of a trailer 12 in a front-to-back configuration (i.e., facing) such that respective base assemblies 22 and, therefore, interior areas thereof are immediately adjacent one another. In fact, the base assemblies 22 may actually be in surface contact with one another. In other words, the front door 26 would be facing in the direction of the semi-truck pulling the trailer. This orientation is critical and will be described in greater detail later with reference to offloading packages from a plurality of storage bins 20 at a common destination (see FIGS. 13-14).

Figure 14:
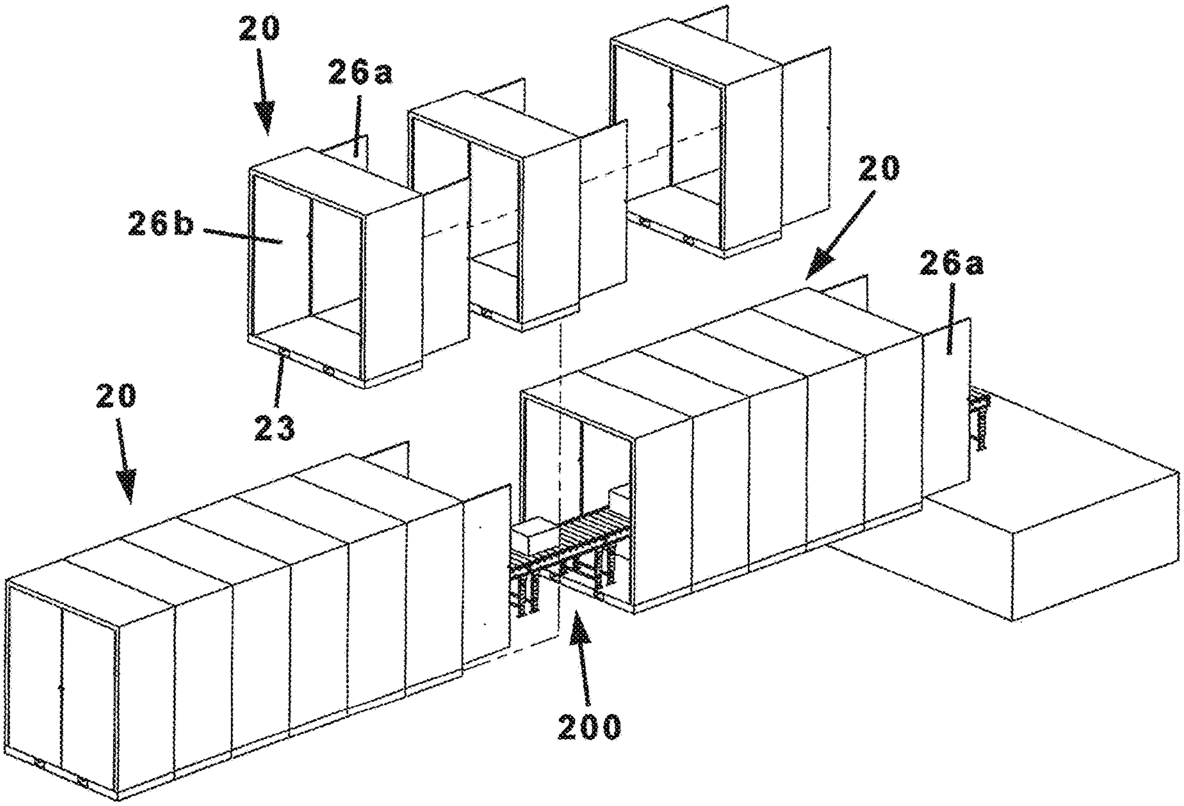
FIG. 14 is another exploded view of the container bins as in FIG. 13 taken from another angle.

When positioned in immediately and tightly adjacent alignment, the first and second doors of each storage bin 20 may be opened without conflict with an adjacent storage bin 20 and such that the interior areas of each storage bin 20 may be more readily accessed. More particularly, when the plurality of storage bins 20 are positioned in adjacent proximities as described above, the distribution method may include the step of opening a respective first door 26*a* of a respective delivery bin 20 such that the opened first door 26*a* is in communication with an interior area defined by a forwardly adjacent storage bin 20 (FIG. 5*b*). Similarly, a respective second door 26*b* of a respective delivery bin 20 may be opened outwardly so as to be in communication with the interior area defined by a rearwardly adjacent storage bin 20. Alternatively, the second door 26*b* may be opened inwardly so as to be out-of-the-way while still allowing access from the rear (FIG. 14). In operation, of course, all doors may be pivotally closed so that each storage bin 20 may be captured and moved, such as by a forklift, without risking any inadvertent spillage of parcels from a respective interior area of a respective storage bin 20. In fact, in an embodiment, each door may include a door locking mechanism, shown in FIGS. 3*d* and 3*e* as a pin 29*b* that is movable between retracted and deployed configurations, whether said pin is activated manually or electrically such as a solenoid.

In another critical aspect, a storage bin 20 that has been filled with parcels destined for a common destination is marked with indicia 40 that is indicative of that final delivery destination in such a manner as common delivery destination (i.e., parcels have been segregated according to a common destination code) will be recognizable by workers at a downstream or intermediate delivery facility and such that a determination can be made if the designated storage bin 20 needs to be offloaded from one delivery vehicle onto a new or a next delivery vehicle that is scheduled for service to the designated final delivery destination. It is understood that the indicia 40 may be a barcode, a QR code, RFID code, a NFC code, or the like and that said code, when properly scanned at an intermediate delivery hub using an appropriate reader may indicate if a transfer (such as via a forklift) to another delivery vehicle is needed. It is understood that the "another delivery vehicle" may be a local delivery van or may be another semitruck trailer en route to a next intermediate delivery destination or even a final delivery destination. In another aspect, the indicia indicating a destination enables loose packages to be quickly matched with an appropriate storage bin or plurality of storage bins having a matching indicia.

The critical focus of the present distribution method is that parcels can be sorted only a single time and then segregated and stored in special storage bins 20 according to their respective final delivery destinations. Further, each storage bin 20 includes a base assembly 22 having a pallet configuration that is useful and efficient for being transferred via forklift or pallet jack to subsequent delivery vehicles destined for the final delivery destination. Importantly, packages already segregated and stored into a designated storage bin 20 need not be unpacked and sorted again at every intermediate distribution hub but need only be transferred via a forklift to a next delivery vehicle that includes delivery service to the final delivery destination. In addition, packages picked up at various intermediate distribution points (e.g., cities located along a delivery journey toward the final destination) may be easily added to a respective storage bin 20 that is clearly marked with its destination by simply opening the respective front door 26 and inserting the added package.

Figure 6:
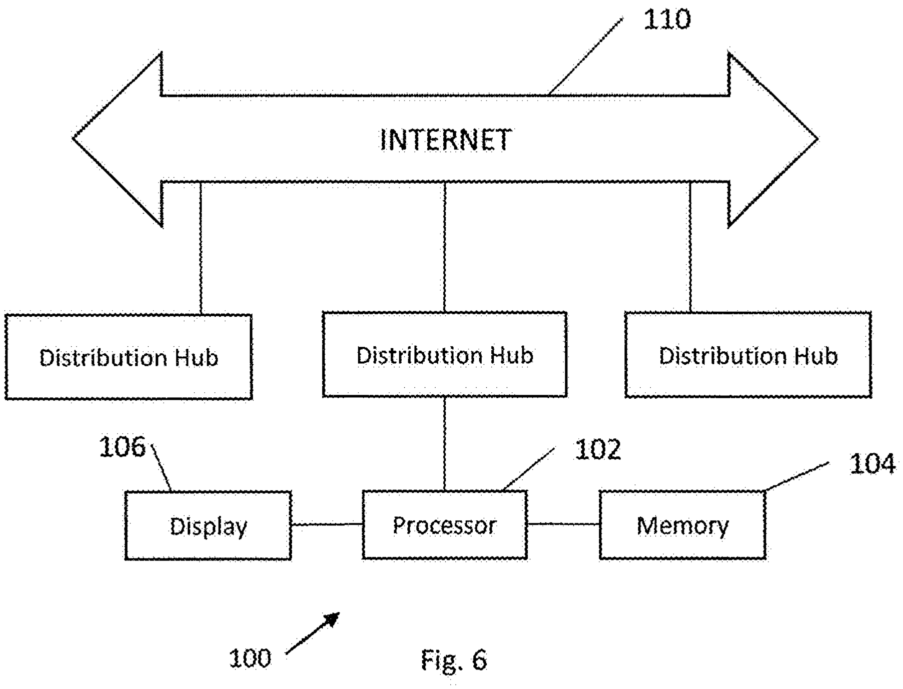
FIG. 6 is a block diagram illustrating the electronic components of the present invention.

The plurality of delivery distribution hubs may be referred to as a delivery network or simply as a network. It is understood that each intermediate distribution hub in the network corresponds to a set of delivery destinations, i.e., residential or commercial addresses, to which parcels may be delivered. The totality of all delivery destinations may reside in a non-volatile memory component of an overall memory of a data processing system 100. More particularly, the data processing system 100 may include one or more processors 102 in data communication with a non-volatile memory 104. Data concerning all possible delivery destinations as well as data which represents specific delivery vehicles that actually deliver to a corresponding delivery destination may also be included in the memory 104. Still further, the processor 102 is configured to determine a tree, i.e., a path of intermediate distribution hubs within said network through which a hypothetical parcel must pass from any given distribution hub on to a final delivery destination. It is understood that the processor 102 may be configured to operate as described above as a result of executing programming which may also be stored in the memory 104. Further, it is understood that the system 100 is accessible via the Internet 110. The electronic components of the present invention are illustrated in FIG. 6.

The distribution method according to a preferred embodiment of the present invention involves the step of transferring a designated storage bin 20 from one delivery vehicle to another delivery vehicle via a respective base assembly 22 according to instructions imparted by the indicia 40 of the designated storage bin 20. It is understood that data read from the indicia 40 may be an input to the processing system 100 such that the processor 102 may utilize the indicia data in combination with the tree that indicates intermediate transfers in order to determine an output indicative of an immediate transfer request, such as may be published on a display 106 at an intermediate delivery distribution hub. In short, workers at an intermediate delivery distribution hub would be notified to offload and transfer the designated storage bin 20 rather than to unload it or submit its parcels to general sorting. Stated another way, the processor 102 is configured to determine if an available delivery vehicle is scheduled to deliver parcels to the final delivery destination or is scheduled to travel to a next intermediate delivery destination in the delivery tree associated with the designated storage bin and, if so, a transfer of the designated storage bin 20 is published and undertaken. This process of moving or sorting storage bins 20 may be referred to as a bin sorting procedure.

Figure 7:
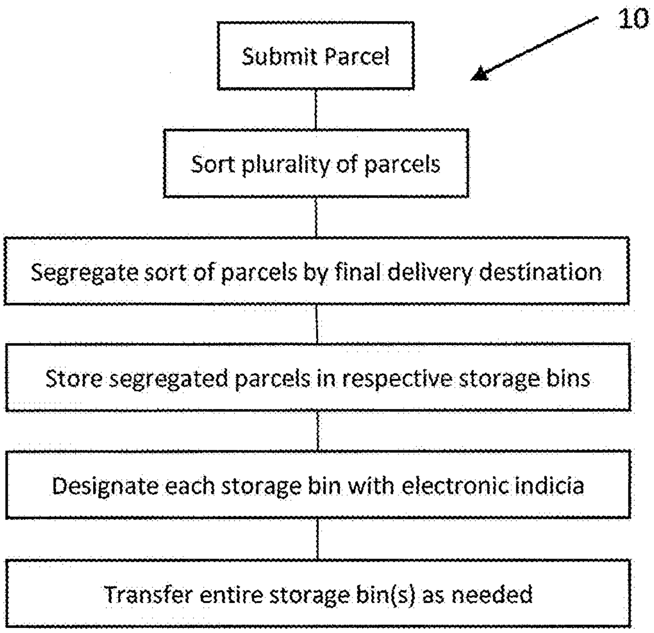
FIG. 7 is a flowchart illustrating the logic of a method according to the preferred embodiment of the present invention.
Figure 8A:
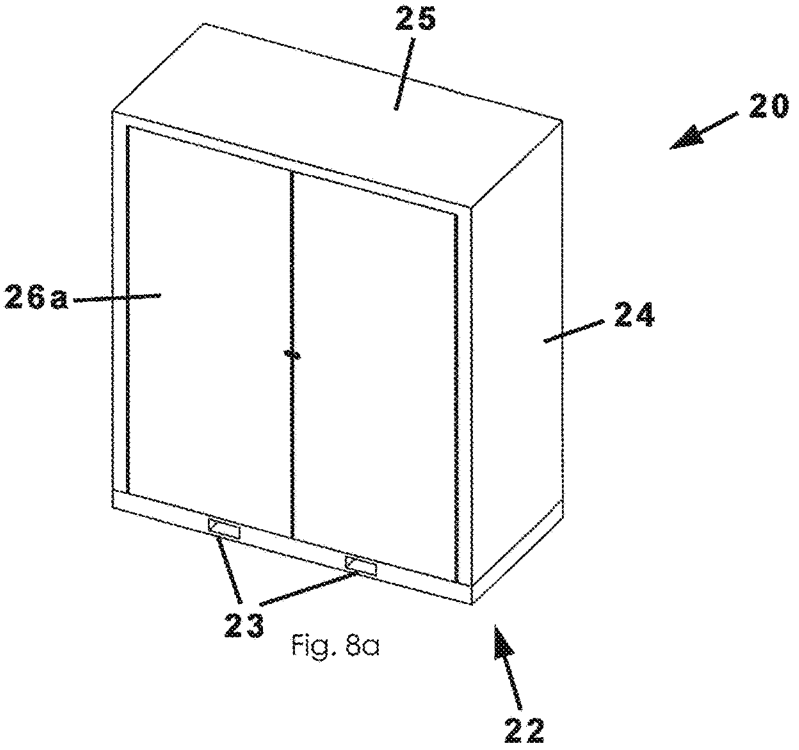
FIG. 8*a* is a perspective view of the storage bin according to the present invention, illustrated with the doors in a closed configuration.
Figure 8B:
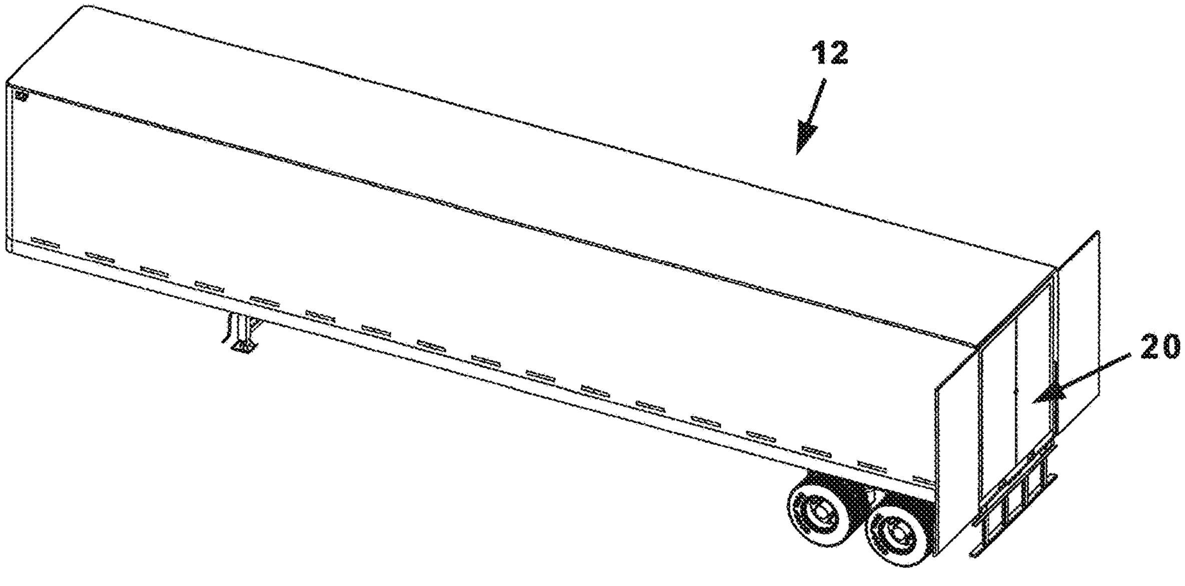
FIG. 8*b* is a perspective view of a semitruck trailer loaded with storage bins according to the present invention.
Figure 9A:
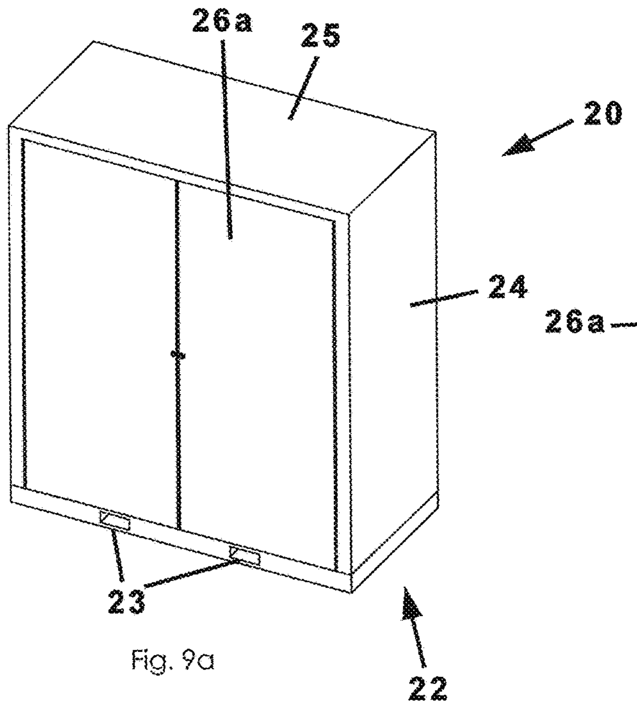
FIG. 9*a* is a perspective view of the storage bin, illustrated with the doors in a closed configuration.
Figure 9B:
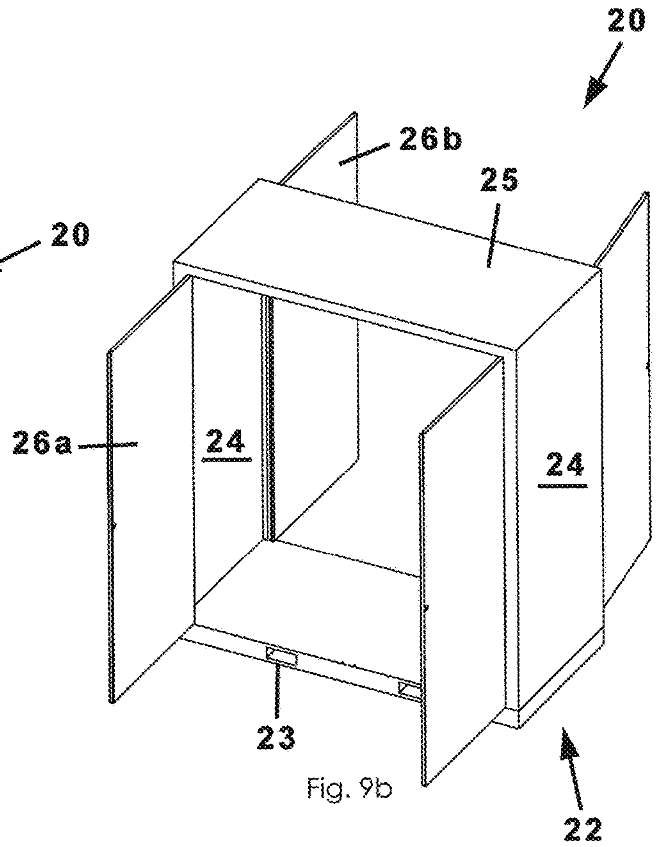
FIG. 9*b* is a perspective view of the storage bin, illustrated with both first and second doors in outwardly open configurations.
Figure 9C:
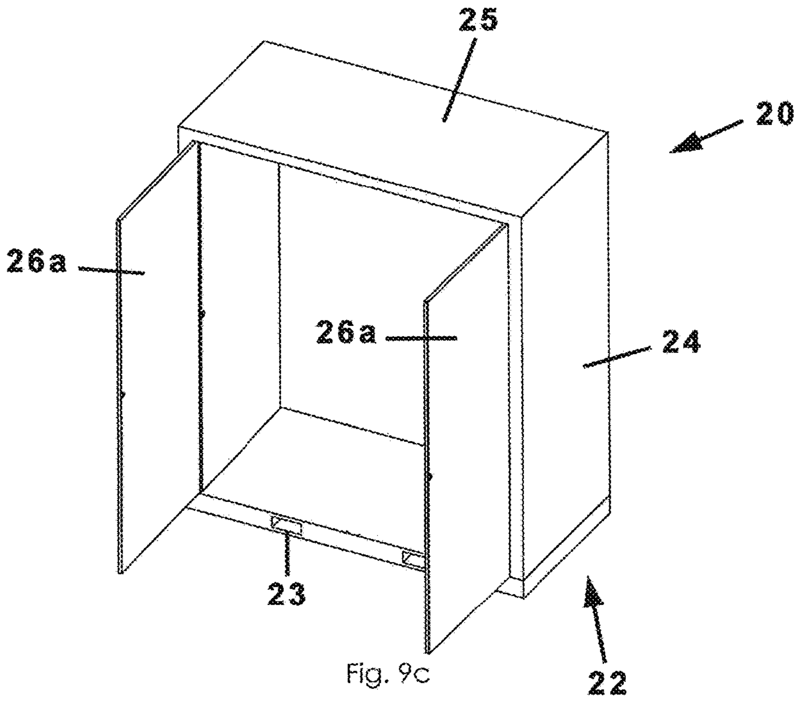
FIG. 9*c* is a perspective view of the storage bin, illustrated with the first doors in an outwardly open configuration.
Figure 10A:
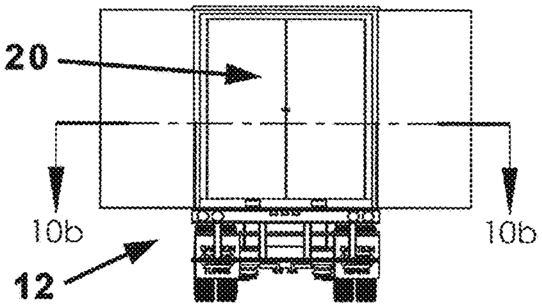
FIG. 10*a* is a rear view of the trailer as in FIG. 8*b;*
Figure 10B:
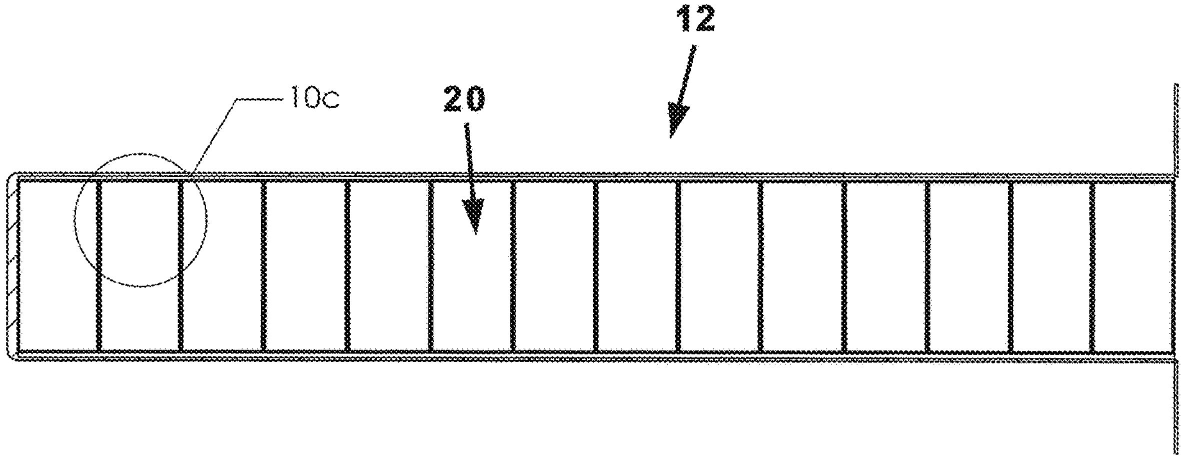
FIG. 10*b* is a sectional view taken along line 10*b*-10*b* of FIG. 10*a;*
Figure 10C:
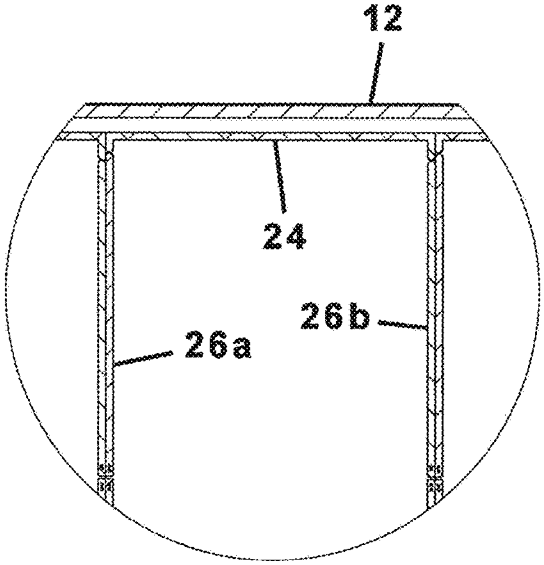
FIG. 10*c* is an isolated view on an enlarged scale taken from FIG. 10*b;*
Figure 11A:
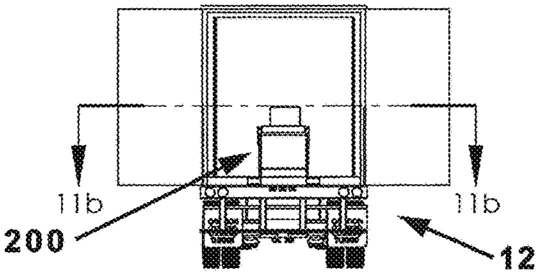
FIG. 11*a* is a rear view of the trailer as in FIG. 8*b;*
Figure 11B:
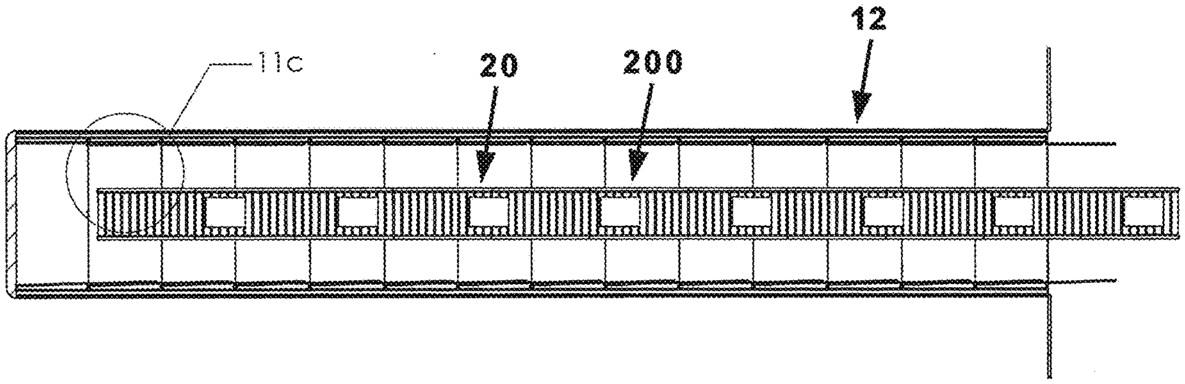
FIG. 11*b* is a sectional view taken along line 11*b*-11*b* of FIG. 11*a;*
Figure 11C:
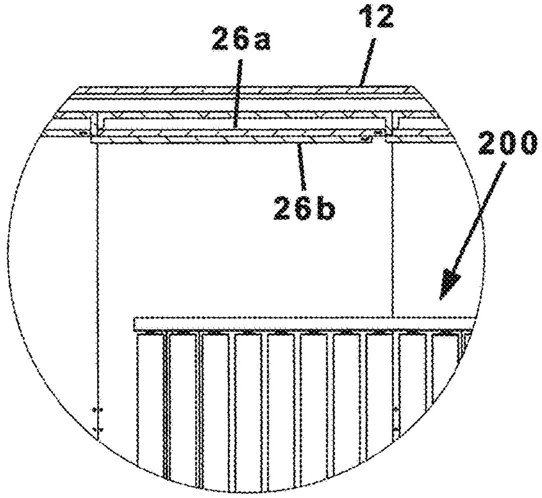
FIG. 11*c* is an isolated view on an enlarged scale taken from FIG. 11*b;*
Figure 12:
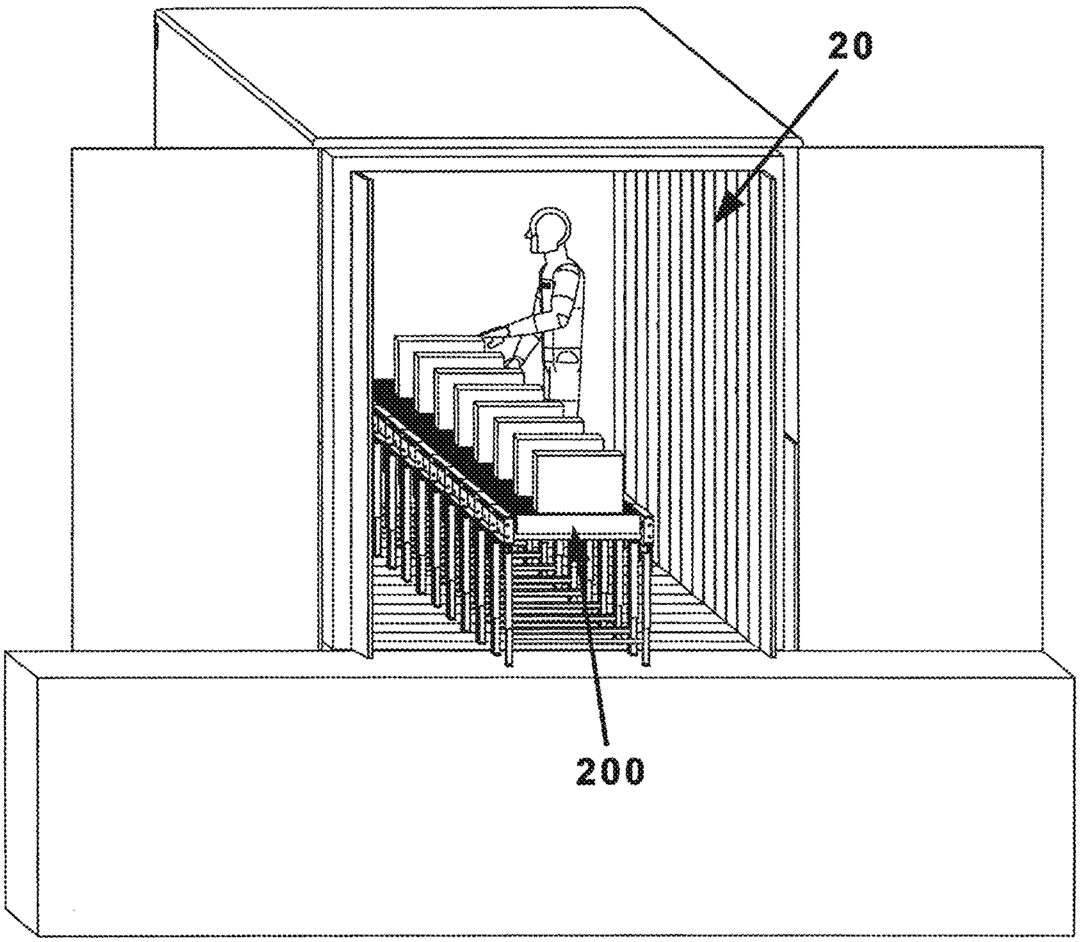
FIG. 12 is a perspective view of the trailer illustrated in FIG. 11*a;*

A summary of a methodology according to a preferred embodiment of the present invention and as described above in greater detail is illustrated in FIG. 7.

It is understood that each intermediate delivery distribution hub may introduce new parcels to the system and may undergo general sorting process that new storage bins corresponding to additional final delivery destinations may be segregated and designated and loaded onto a delivery vehicle. Even so, any pre-existing designated storage bin 20 is not unloaded or made part of the local sorting. However, it is possible that if there are new parcels segregated to or corresponding to the same final delivery destination as encoded in a pre-existing designated storage bin 20, it would be possible to open a respective first door of the pre-existing designated storage bin 20 and add/store the new parcels that share the same final delivery destination designation.

As will be illustrated below, the storage bins 20 may be unloaded without removing the storage bins 20 from the trailer that transported them. This is possible in that trailers reaching a final destination include only bins containing packages corresponding to the final destination and, further, each storage container is oriented front-to-back (i.e., is frontward facing) and has doors that can open so that a conveyor belt assembly 200 may be extended simultaneously through all of the storage bins 20. The improvements and novelty of the present invention is best understood when considering a real-world example of the recited methodology although the numbers of packages and bins is illustrative only.

Figure 16:
FIG. 16 is a map showing the geographic location and proximity of cities described in an example of the present invention.
Figure 17:
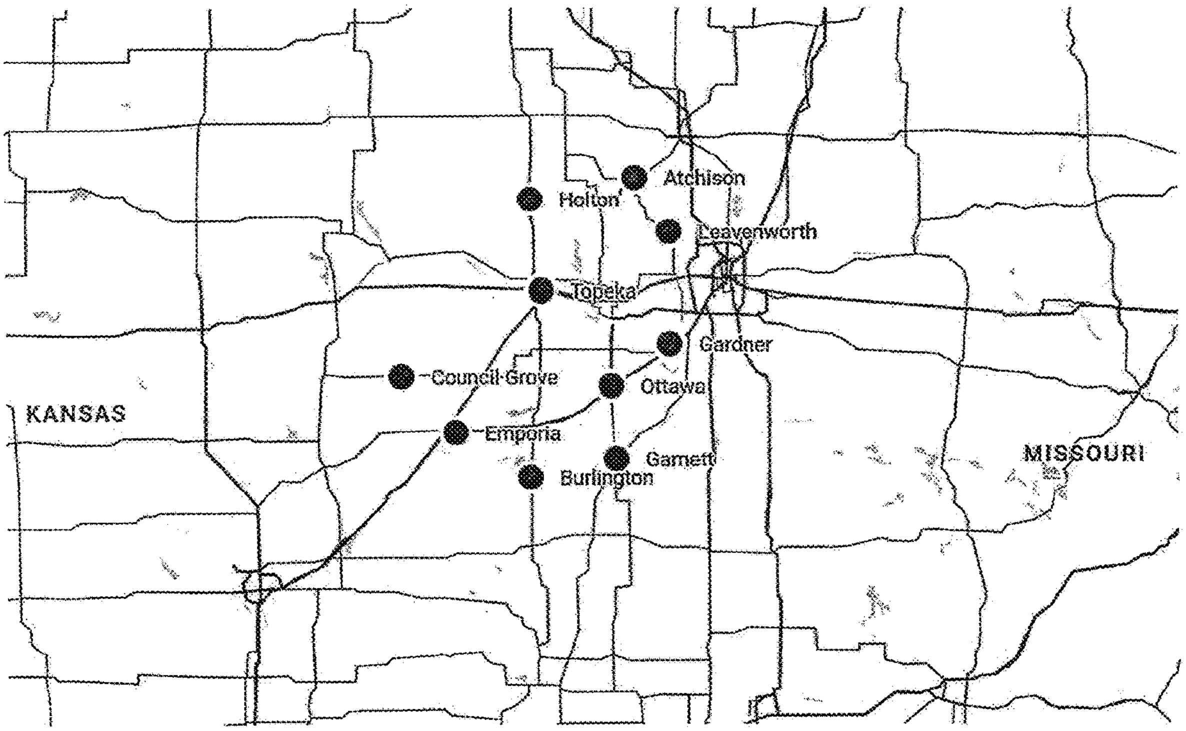
FIG. 17 is another map showing the geographic location and proximity cities described in an example of the present invention.

In an embodiment, each 28' trailer can receive 8 bins. each bin holding 70-150 packages depending on size. Rather than rehandling the 560-1200 individual packages at each node of a delivery network, the previously sorted and segregated bins are moved. In this example, individual packages are only placed in bins in Kansas City, Omaha, and Oklahoma City and the bins are moved to Topeka, Kansas where they are initially consolidated for efficient transport to their final destinations, respectively. Maps showing the relative geographic locations and proximity of these cities are shown in FIGS. 16 and 17 so as to bring clarity and understanding to the inventive methodology and to the example disclosed below.

In this example, the final destination is Ottawa, Kansas and surrounding towns. Bins are made for Ottawa, Garnett. Gardner, Emporia. Burlington, Council Grove, Holton, Atchison, and Leavenworth. Sorted and segregated bins for these towns are prepared in Kansas City (KC), Omaha (OM), and Oklahoma City (OC) in this hypothetical example. In other words, segregated storage bins 20 addressed to all of the Ottawa and surrounding towns may be prepared and shipped (by trailer or other storage vehicle) from any or all of the three towns remote from the Ottawa, Kansas area. Then, according to this example, all of these storage bins will be delivered by trailer to a more local sorting facility of Topeka, Kansas where the bins will be consolidated for final shipment to the surrounding towns.

29 total bins being sorted, segregated, and originating from KC 37 total bins being sorted, segregated, and originating from OM 36 total bins being sorted, segregated, and originating from OC Total of 102 bins sent on trailers to Topeka where the plurality of trailers and bins are received prior to being consolidated.

More particularly, all of these trailers go to Topeka for a bin sort. Rather than rehandle 6271 packages, employees only move and organize the bins according to their final destinations in the Ottawa and surrounding area as follows.

The 29 bins from KC trailers consist of
0 Ottawa,
5 Garnett,
3 Gardner,
1 Emporia,
1 Burlington,
4 Council Grove,
2 Holton,
7 Atchison,
6 Leavenworth.
Total of 4 trailers The 37 bins from OM consist of
4 Ottawa,
7 Garnett,
2 Gardner,
6 Emporia,
5 Burlington,
3 Council Grove,
2 Holton,
4 Atchison,
4 Leavenworth.
Total of 5 trailers The 36 bins from OC consist of
5 Ottawa,
4 Garnett,
5 Gardner,
7 Emporia,
2 Burlington,
3 Council Grove,
6 Holton,
4 Atchison,
4 Leavenworth
Total of 4 trailers These 13 trailers arrive in Topeka. The bins themselves are re-sorted and consolidated for a final journey to their final destination as shown here:

9 Ottawa bins or 1 full trailer of 8 bins then a partial trailer with 1 bin

16 Garnett bins or 2 full trailers

10 Gardner bins or 1 full trailer 1 partial trailer with 2 bins

14 Emporia bins or 1 full trailer 1 partial trailer with 6 bins

8 Burlington bins or 1 full trailer

10 Council Grove bins or 1 full trailer 1 partial trailer with 2 bins

10 Holton bins, 1 full trailer 1 partial trailer with 2 bins

15 Atchison bins, 1 full trailer 1 partial trailer with 7 bins
14 Leavenworth bins 1 full trailer 1 partial trailer with 6 bins Then, handle loose packages (loose packages are simply inserted into respective storage bins (or alongside them) rather than unloading and re-sorting all packages together). After all this bin movement happens but almost at the same time trailers from Ottawa, Garnett, Gardner, Emporia, Burlington, Council Grove, Holton, Atchison, Leavenworth come in with loose packages to Topeka. These loose packages are for those Kansas only cities that are also re-sorted in Topeka. For example, an Ottawa trailer might come in with 200 loose packages for Leavenworth so those will go into that partial trailer with the packages stacked loose not in a bin.

Figure 13:
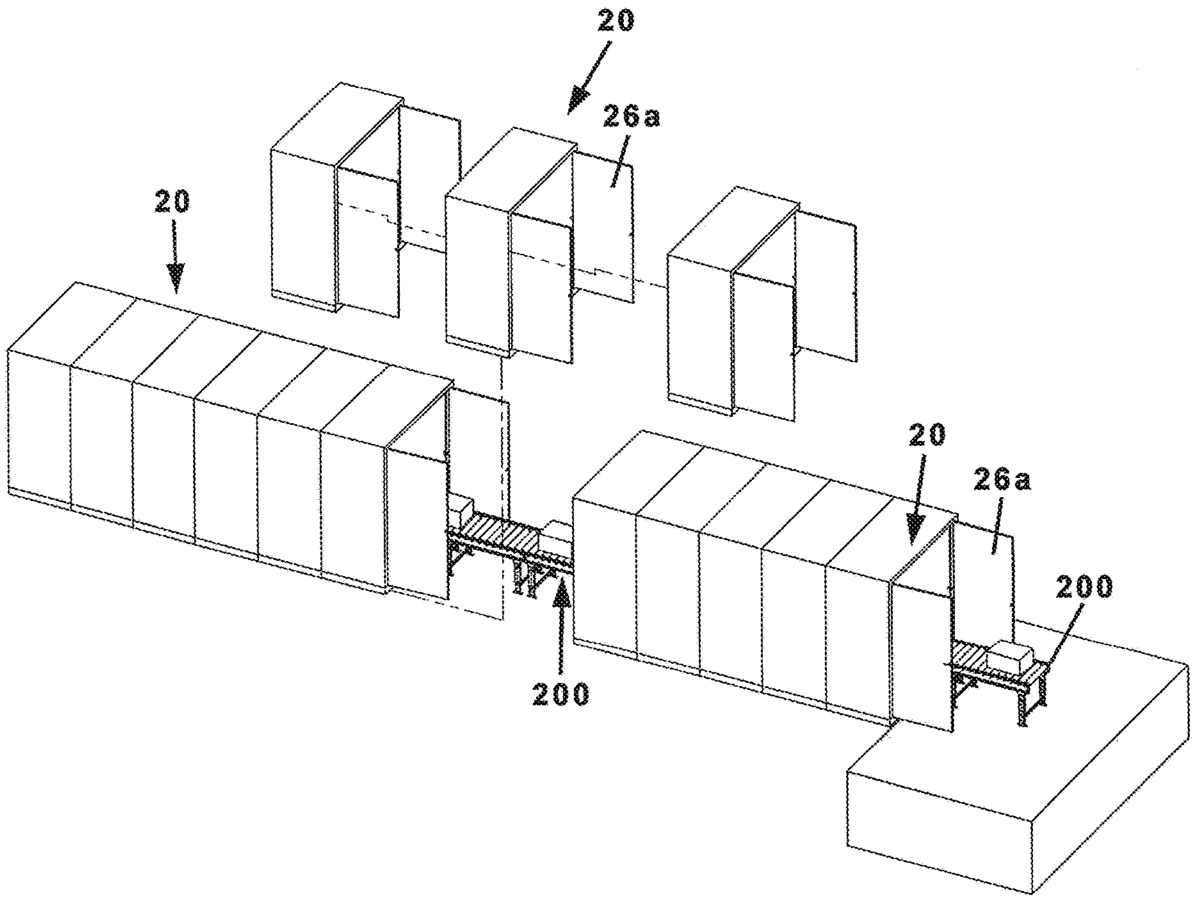
FIG. 13 is an exploded view of the container bins as illustrated in FIGS. 11*b* and 12 and with the semitruck trailer removed for clarity.

Then, once the storage bins reach their final destinations, the storage bins 20 may be quickly unloaded while still positioned atop respective trailers. For example, all of the storage bins that are designated for Emporia are situated in adjacent front-to-back positions (i.e., forwardly facing) atop a single trailer. Respective front and rear doors 26*a*, 26*b* may be opened and a conveyor belt assembly 200 may be extended simultaneously through all respective storage bins 20 such that packages may be offloaded quickly and efficiently (FIGS. 13-14).

It is critical to note that in all of the movement of packages illustrated in the example above, previously sorted and segregated storage bins were moved or reorganized but the thousands of potential packages stored therein were not rehandled or re-sorted.

It is understood that while certain forms of this invention have been illustrated and described, it is not limited thereto except insofar as such limitations are included in the following claims and allowable functional equivalents thereof.

The invention claimed is:

1. A method for distribution of parcels which avoids repeated sorting steps at downstream distribution hubs by segregating said parcels at a first distribution hub according to a final destination such that said segregated parcels are distributed at downstream distribution hubs without re-sorting said segregated parcels, said distribution method comprising:

providing a plurality of delivery bins each having a base assembly and a pair of side walls extending upwardly from said base assembly and having a top wall extending between the upper ends of said pair of side walls, said each delivery bin defining a height, a width, and a depth, each delivery bin having (1) a first door that is selectively movable between an open configuration allowing front access to an interior area and a closed configuration blocking front access to said interior area and (2) a second door that is selectively movable between an open configuration allowing back-side access to said interior area and a closed configuration blocking back-side access to the interior area;

positioning said plurality of delivery bins immediately adjacent to one another in a forward-facing configuration such that a front of one delivery bin is immediately adjacent a rear of a forwardly adjacent delivery bin;

opening a respective first door of a respective delivery bin into communication with the interior area defined by a forwardly adjacent delivery bin when said plurality of delivery bins are positioned immediately adjacent to one another:

opening a respective second door of a respective delivery bin so as to allow access to the interior area of the respective delivery bin;

wherein said first and second doors each have a double-hinged configuration that enables 180° movement and overlapping configurations;

wherein said interior area is a void configured to allow passage through a respective delivery bin when said first and second doors are opened, respectively;

initially sorting a plurality of packages according to a final delivery destination associated with a respective package, thereby segregating said sorted packages;

storing said segregated packages having a common final delivery destination in respective delivery bins;

designating with indicia that said respective delivery bin is for delivery to said final delivery destination;

loading said designated delivery bin onto a delivery trailer if said delivery trailer is scheduled to provide downstream delivery service to said final delivery destination;

receiving at a regional delivery hub a plurality of delivery bins from a plurality of delivery trailers each originating remotely from said regional delivery hub that, together, include respective delivery bins having a plurality of disparate final delivery destinations;

utilizing a bin sort procedure, consolidating said received delivery bins onto at least one auxiliary delivery trailer containing only delivery bins having said common final delivery destination; and extending an elongate conveyor belt assembly simultaneously through respective interior areas of said consolidated delivery bins when said respective first and second doors of said plurality of delivery bins are in said open configurations, respectively, and while said consolidated delivery bins are still situated atop said auxiliary delivery trailer.

2. The distribution method as in claim 1, wherein the base assembly includes a pallet defining at least a pair of spaced apart lift channels each being configured to receive respective arms of a forklift or pallet jack.

3. The distribution method as in claim 2, wherein said bin sort procedure includes lifting said designated delivery bin via the lift channels associated therewith to another delivery trailer providing service to said final delivery destination without sorting or handling individual packages stored in said transported delivery bin.

4. The distribution method as in claim 3, further comprising correlating said final delivery destination with a plurality of distribution hubs so as to determine every distribution hub at which said designated delivery bin will be transferred to another delivery vehicle in order to reach said final delivery destination.

5. The distribution method as in claim 4, further comprising loading said designated delivery bin into a delivery vehicle if said delivery vehicle is scheduled to arrive at a downstream distribution hub where said designated delivery bin is determined to be transferred to said another delivery vehicle.

6. The distribution method as in claim 5, wherein said plurality of distribution hubs constitutes a network of participating distribution entities.

7. The distribution method as in claim 1, further comprising inserting loose packages into the selected delivery bin having a corresponding indicia indicative of a final delivery destination.

8. A method for distribution of parcels which avoids repeated sorting steps at downstream distribution hubs by segregating said parcels at a first distribution hub according to a final destination such that said segregated parcels are distributed at downstream distribution hubs without re-sorting said segregated parcels, said distribution method comprising:

providing a plurality of delivery bins each having a base assembly and a pair of side walls extending upwardly from said base assembly and having a top wall extending between the upper ends of said pair of side walls, said each delivery bin defining a height, a width, and a depth, each delivery bin having (1) a first door that is selectively movable between an open configuration allowing front access to an interior area and a closed configuration blocking front access to said interior area and (2) a second door that is selectively movable between an open configuration allowing back-side access to said interior area and a closed configuration blocking back-side access to the interior area;

wherein said first and second doors each have a double-hinged configuration that enables 180° movement and overlapping configurations;

positioning said plurality of delivery bins immediately adjacent to one another in a forward-facing configuration such that a front of one delivery bin is immediately adjacent a rear of a forwardly adjacent delivery bin;

opening a respective first door of a respective delivery bin into communication with the interior area defined by a forwardly adjacent delivery bin when said plurality of delivery bins are positioned immediately adjacent to one another;

opening a respective second door of a respective delivery bin into communication with the interior area defined by a rearwardly adjacent delivery bin when said plurality of delivery bins are positioned immediately adjacent to one another;

wherein said interior area is a void configured to allow passage through a respective delivery bin when said first and second doors are opened, respectively;

initially sorting a plurality of packages according to a final delivery destination associated with a respective package, thereby segregating said sorted packages;

storing said segregated packages having a common final delivery destination in respective delivery bins;

designating with indicia that said respective delivery bin is for delivery to said final delivery destination;

loading said designated delivery bin onto a delivery trailer if said delivery trailer is scheduled to provide downstream delivery service to said final delivery destination;

receiving at a regional delivery hub a plurality of delivery bins from a plurality of delivery trailers each originating remotely from said regional delivery hub that, together, include respective delivery bins having a plurality of disparate final delivery destinations;

utilizing a bin sort procedure, consolidating said received delivery bins onto at least one auxiliary delivery trailer containing only delivery bins having said common final delivery destination; and extending an elongate conveyor belt assembly simultaneously through respective interior areas of said consolidated delivery bins when (1) said respective first and second doors of said plurality of delivery bins are in said open configurations, respectively, and (2) while said plurality of consolidated delivery bins are situated atop said auxiliary delivery trailer.

9. The distribution method as in claim 8, wherein the base assembly includes a pallet defining at least a pair of spaced apart lift channels each being configured to receive respective arms of a forklift or pallet jack.

10. The distribution method as in claim 8, wherein said bin sort procedure includes transporting said designated delivery bin via the base assembly associated therewith to another delivery vehicle giving service to said final delivery destination without sorting the segregated packages therein.

11. The distribution method as in claim 10, further comprising loading said designated delivery bin into a delivery vehicle if said delivery vehicle is scheduled to arrive at a downstream distribution hub that is configured to determine if a further transfer is required to reach a corresponding final delivery destination.

12. The distribution method as in claim 10, wherein said plurality of distribution hubs constitute a network of participating distribution entities.

13. The distribution method as in claim 12, wherein each delivery bin includes a door locking mechanism.

14. The distribution method as in claim 12, further comprising a processor in data communication with said network of participating distribution entities and with a non-volatile memory configured to store data indicative of network distribution protocols, said delivery vehicles, and a database including delivery addresses serviced by said delivery vehicles.

15. The distribution method as in claim 8, wherein said indicia includes one of a barcode, a QR code, a RFID tag, or an NFC tag.

* * * * *